(12) United States Patent
Kim

(10) Patent No.: US 7,095,461 B2
(45) Date of Patent: Aug. 22, 2006

(54) LIQUID CRYSTAL DISPLAY DEVICE COMPRISING A PAD IN CONTACT WITH A LIGHT GUIDE AND MAINTAINING A DISTANCE BETWEEN A PANEL GUIDE AND A BACKLIGHT ASSEMBLY

(75) Inventor: Kyoung Sub Kim, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/820,702

(22) Filed: Mar. 30, 2001

(65) Prior Publication Data
US 2002/0030771 A1    Mar. 14, 2002

(30) Foreign Application Priority Data
Aug. 21, 2000    (KR) ................. 2000-48433

(51) Int. Cl.
*G02F 1/1333*    (2006.01)
(52) U.S. Cl. .................. 349/58; 349/64; 349/65; 362/615; 362/634
(58) Field of Classification Search ............... 349/58, 349/60, 65, 64, 150; 362/561, 614, 615, 362/632–634
See application file for complete search history.

(56) References Cited

U.S. PATENT DOCUMENTS

| 5,146,354 | A | * | 9/1992 | Plesinger ..................... 359/49 |
| 5,703,665 | A | * | 12/1997 | Muramatsu et al. .......... 349/60 |
| 5,808,707 | A | * | 9/1998 | Niibori et al. ................ 349/60 |
| 5,929,950 | A | * | 7/1999 | Matsuda ...................... 349/60 |
| 6,195,141 | B1 | * | 2/2001 | Kawano et al. ............... 349/58 |

FOREIGN PATENT DOCUMENTS

JP    2000-066204    *    3/2000

* cited by examiner

*Primary Examiner*—Dung T. Nguyen
*Assistant Examiner*—Thoi V. Duong
(74) *Attorney, Agent, or Firm*—McKenna Long & Aldridge LLP

(57) ABSTRACT

A liquid crystal display device that can prevent optical sheets from being damaged and wrinkled by a panel guide. In the device, a backlight assembly radiates a light onto the liquid crystal panel. A panel guide is provided between the backlight assembly and the liquid crystal panel to support the liquid crystal panel. A pad is provided between the panel guide and the backlight assembly to maintain a distance between the panel guide and the backlight assembly and to shut off a heat and a foreign substance flowing into the liquid crystal panel.

18 Claims, 5 Drawing Sheets

LAMP HEAT PENETRATION

LIQUID CRYSTAL DISPLAY DEVICE COMPRISING A PAD IN CONTACT WITH A LIGHT GUIDE AND MAINTAINING A DISTANCE BETWEEN A PANEL GUIDE AND A BACKLIGHT ASSEMBLY

This application claims the benefit of Korean Patent Application No. 2000-48433, filed on Aug. 21, 2000, which is hereby incorporated by reference.

BACKGROUND OF THE INVENTION

1. Field of the Invention

The present invention relates to a liquid crystal display, and more particularly to a liquid crystal display that is capable of preventing optical sheets from being damaged and wrinkled by a panel guide.

2. Discussion of the Related Art

Generally, as shown in FIG. 1 and FIG. 2, a liquid crystal module used as a display device in a notebook computer includes a main frame 14 received with a backlight assembly, a panel guide 12 attached to the upper portion of the main frame 14 in parallel, a liquid crystal panel 2 loaded onto the panel guide 12, a top case 16 for surrounding the edge of the liquid crystal panel 2 and the side of the main frame 14, and a bottom case 10 contacting the side of the top case 16 to surround the bottom of the liquid crystal module. As shown in FIG. 2, the backlight assembly includes a lamp housing 18 mounted with a lamp 20, a light guide 6 for converting a light inputted from the lamp 20 into a surface light source, and optical sheets 4 attached to the light guide to improve the efficiency of light incident to the liquid crystal panel 2. The optical sheets 4 consist of a plurality of stacked sheets such as a diffusion sheet, a prism sheet, a protective sheet and the like. The main frame 14 is usually made from a mold material, a metal or the like to fix and support the backlight assembly. The panel guide 12 is molded from a resin material such as polycarbonate, etc. and is attached to the upper portion of the main frame 14 to support the liquid crystal panel 2 from the lower portion thereof. In this panel guide 12, a jaw or stepped prominence is provided at the upper surface of a panel loader loaded with a liquid crystal panel 2 so that the liquid crystal panel can be secured thereto. The sides of top case 16 and the bottom case 10 overlap one another and are fixed together by a screw. In the liquid crystal panel 2, a liquid crystal is injected between two sheets of glass substrates. A polarizer is attached to each sheet of glass substrate. The liquid crystal pixel cells are arranged in a matrix. Each liquid crystal pixel cell is driven with a thin film transistor (TFT). A tape carrier package (TCP) 22 mounted with drive integrated circuits (IC's) is provided between a signal line pad formed at the edge of the liquid crystal panel 2 and a printed circuit board (PCB) 8 installed under the main frame 14. A gasket 24 for shielding against electromagnetic interference (EMI) is provided between the PCB 8 and the bottom case 10.

However, a gap of about 0.4±α (for example 0.4±0.1 mm) exists between the panel guide 12 and the optical sheet 4. A thickness of the panel loader in the panel guide 12 is set to approximately 0.7 to 0.8 mm as shown in FIG. 3. This causes the problem that the panel guide 12 is pressed down by a load of the liquid crystal panel 2 itself or a pressure generated upon assembly, etc. to pressurize the optical sheet 4 in the conventional liquid crystal module. If the edge of the optical sheet 4 is pressed down by the panel guide 12, then the corresponding portion of the optical sheet 4 is wrinkled or damaged and results in a dark display portion on the picture display at the edge of the optical sheet 4. In the conventional liquid crystal module, also, the liquid crystal is deteriorated and the optical sheets 4 wrinkle due to heat that is generated in the lamp 20 and applied to the liquid crystal panel 2 through the gap between the panel guide 12 and the backlight assembly. Furthermore, the conventional liquid crystal module has a problem in that a short between the pads or the patterns is generated by a foreign substance flowing into the liquid crystal panel 2, the PCB 8 and the TCP 22 via the gap upon change of the backlight assembly or in an assembly process of the liquid crystal module.

SUMMARY OF THE INVENTION

Accordingly, the present invention is directed to a liquid crystal display that substantially obviates one or more of the problems due to limitations and disadvantages of the related art.

An object of the present invention is to provide a liquid crystal display that is capable of preventing optical sheets from being damaged or wrinkled by a panel guide.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device according to the present invention includes a liquid crystal panel; a backlight assembly for radiating light onto the liquid crystal panel; a panel guide provided between the backlight assembly and the liquid crystal panel to support the liquid crystal panel; and a pad or insulator provided between the panel guide and the backlight assembly to maintain a constant distance between the panel guide and the backlight assembly and to shut off heat and to prevent a foreign substance from flowing into the liquid crystal panel.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 1:
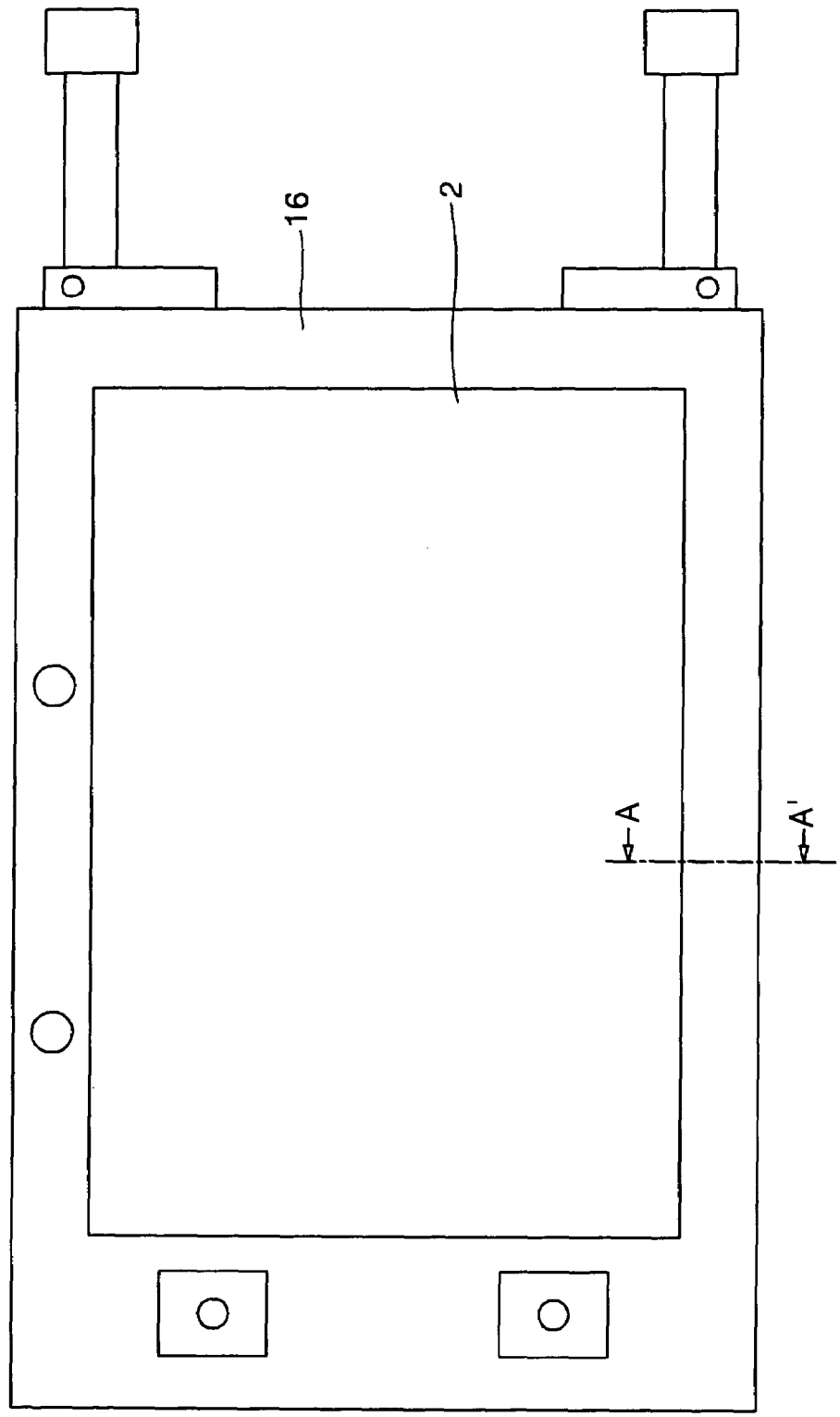
FIG. 1 is a plan view showing a structure of a conventional liquid crystal module.
Figure 2:
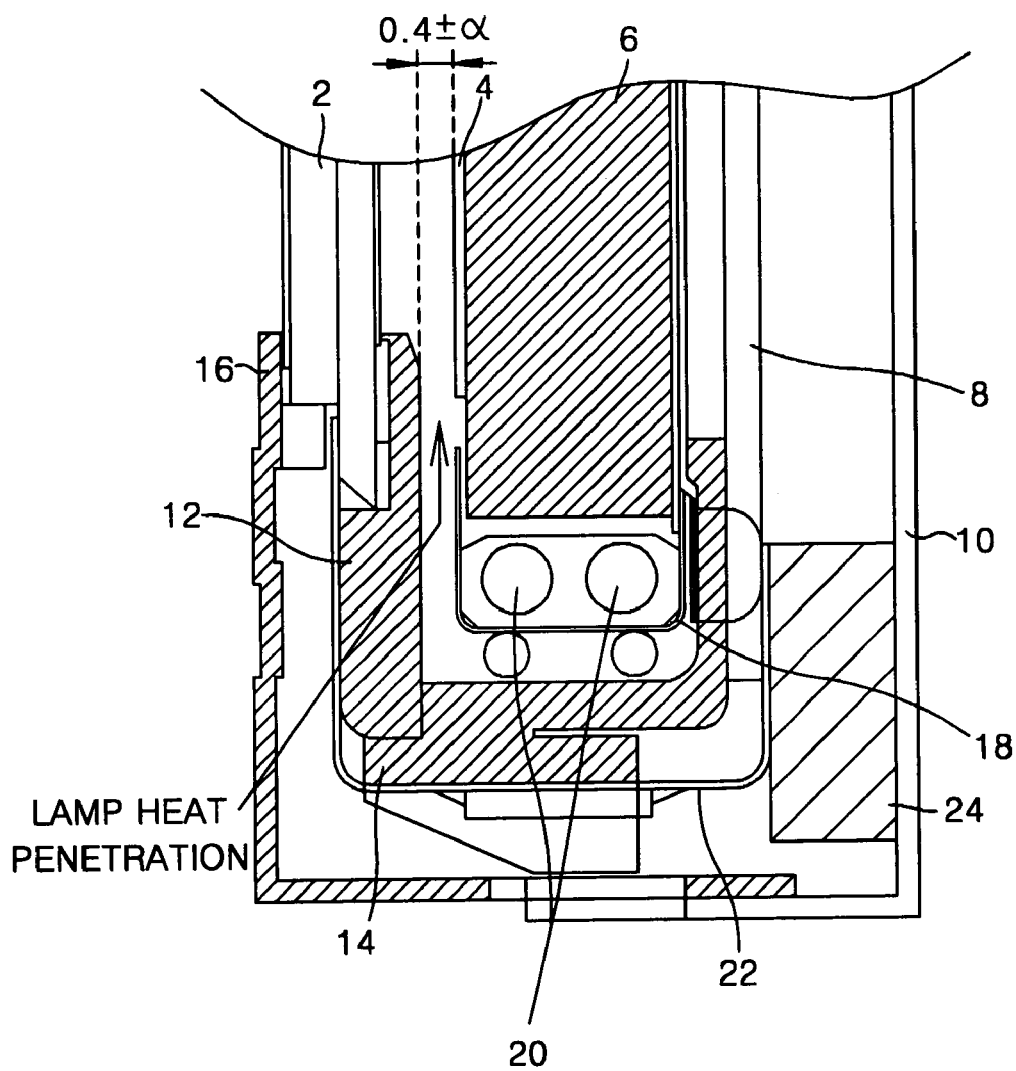
FIG. 2 is a section view of the liquid crystal module taken along the A–A' line in FIG. 1.
Figure 3:
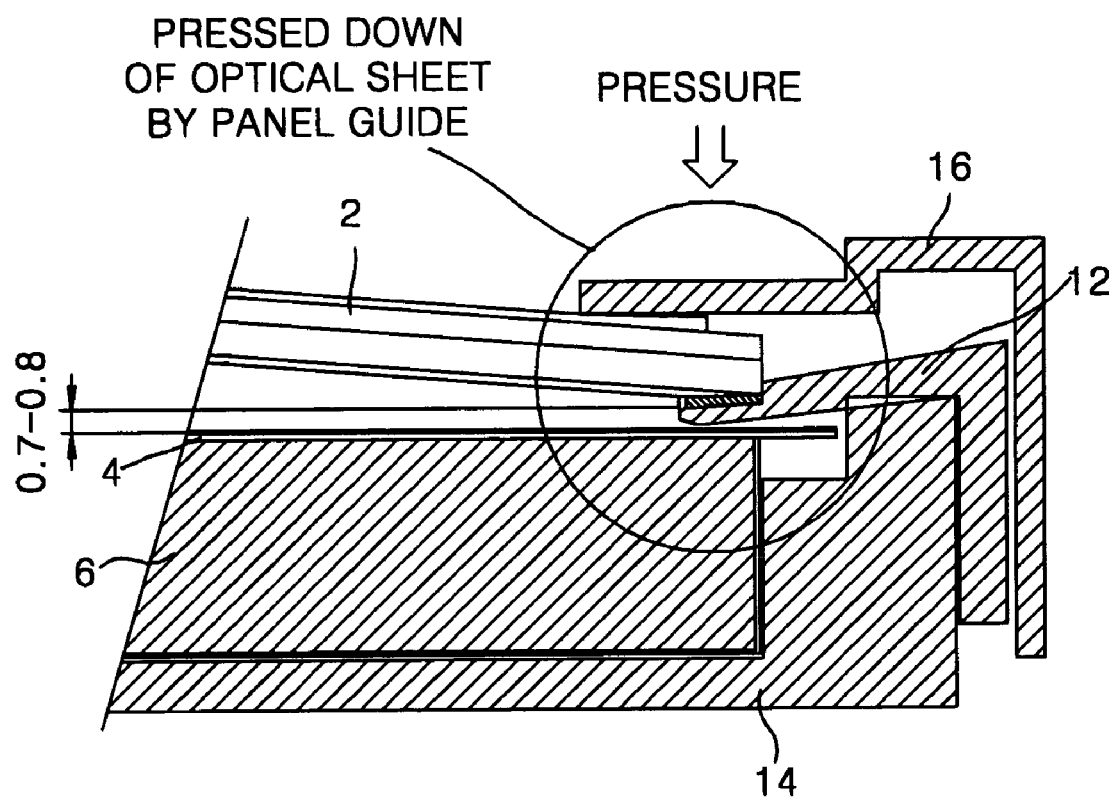
FIG. 3 is a section view representing a state in which the guide panel in FIG. 2 has been pressed down.
Figure 4:
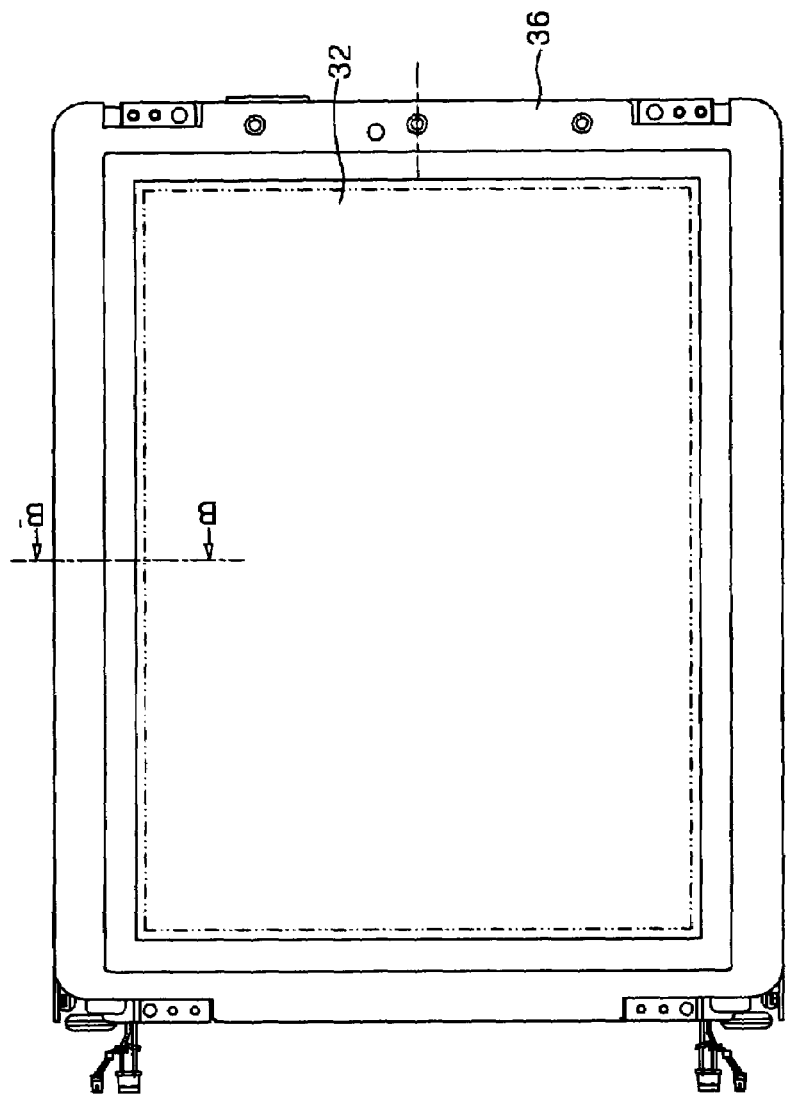
FIG. 4 is a plan view showing a structure of a liquid crystal module according to an embodiment of the present invention.
Figure 5:
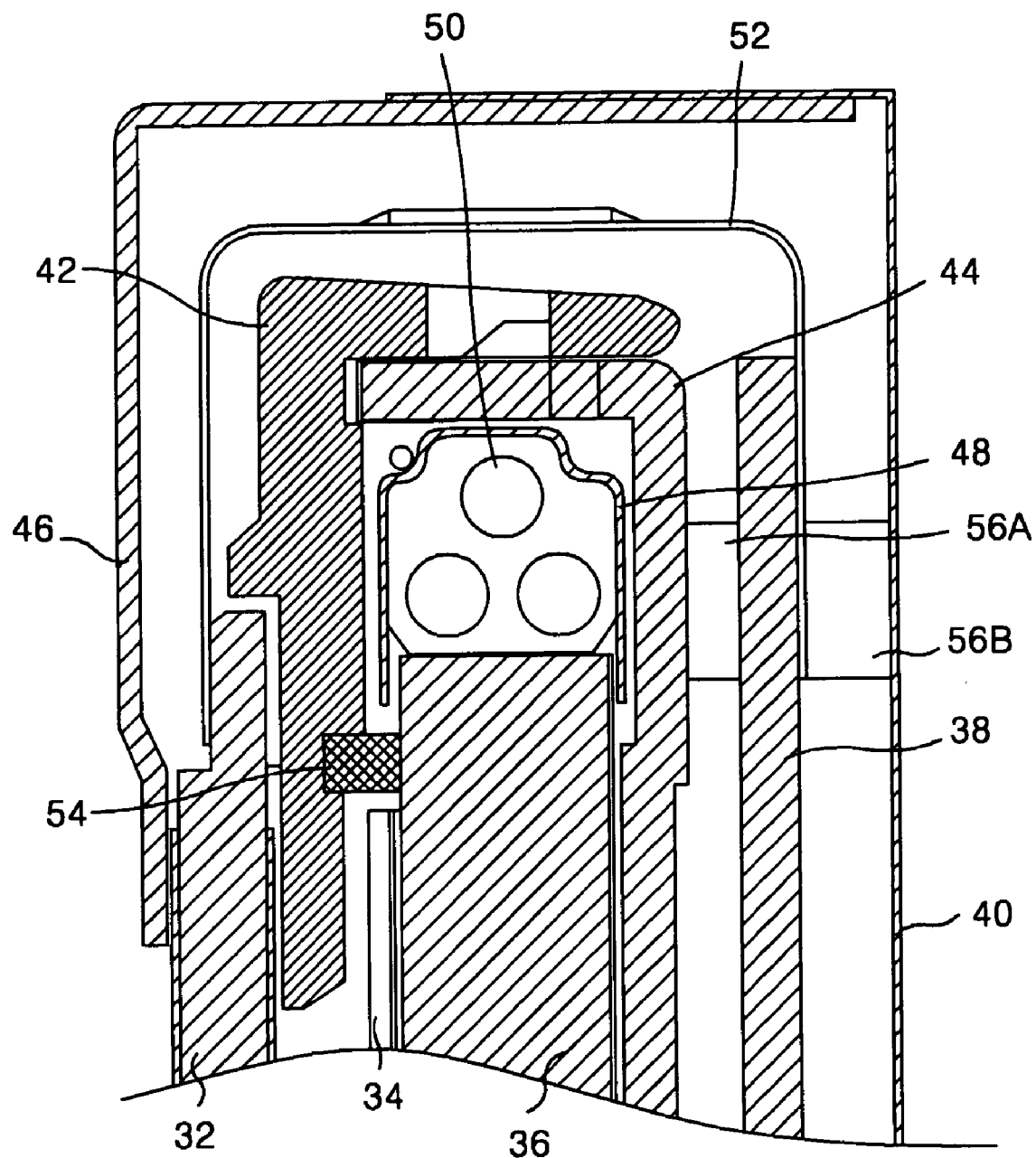
FIG. 5 is a section view of the liquid crystal module taken along the B–B' line in FIG. 4.

Referring to FIG. 4 and FIG. 5, there is shown a liquid crystal display (LCD) according to a first embodiment of the present invention. The LCD includes a first silicon pad 54 provided between a backlight assembly and a panel guide 42, a second silicon pad 56A provided between a main frame 44 and a printed circuit board (PCB) 38, and a third silicon pad 56B provided between the PCB 38 and the bottom case 40. The backlight assembly has a lamp 50, a lamp housing 48, a light guide 36 and optical sheets 34, and is received within the main frame 44 to be secured by the main frame 44. The first silicon pad 54 is substantially made from an elastic silicon, and is provided between the light guide 36 and the panel guide 42 to support the panel guide 42. The first silicon pad 54 maintains a constant gap between the optical sheet 34 and the panel guide 42. Also, the first silicon pad 54 shuts off heat generated from the lamp 50 and prevents heat flow into the liquid crystal panel 32 and the optical sheets 34. The first silicon pad 54 also prevents any foreign substance from flowing into the liquid crystal panel. The second silicon pad 56A maintains a distance between the main frame 44 and the PCB 38, while the third silicon pad 56B maintains a distance between the PCB 38 and the bottom case 40. The first, second and third silicon pads 54, 56A and 56B are installed to surround the liquid crystal module in a shape of square stripe. These silicon pads 54, 56A and 56B may be formed entirely of resin or by a coating of the resins.

The panel guide 42 is attached to the upper portion of the main frame 44, and a hole allowing the first silicon pad 54 to be secured to the bottom surface of that upper portion is provided. Sides of a top case 46 and a bottom case 40 overlap each other to be secured to each other by a screw (not shown). A tape carrier package (TCP) 52 is attached between the pad part formed at the edge of the liquid crystal panel 32 and the output pad of the PCB 38 by an anisotropic conductive film (ACF). A gasket for shielding against EMI may be installed between the PCB 38 and the bottom case 40.

As described above, the liquid crystal display according to the present invention has the silicon pad 54 provided between the panel guide 42 and the backlight assembly. By the silicon pad 54, the present liquid crystal display is capable of preventing the panel guide from being pressed down and shields heat inputted from the lamp 20 or a foreign substance, thus minimizing damage and wrinkling of the optical sheets 34. Furthermore, the present liquid crystal display provides the silicon pads between the main frame 44 and the PCB 38 and between the PCB 38 and the bottom case 40 to maintain the distances between the main frame 44 and the PCB 38 and between the PCB 38 and the bottom case 40 and prevents any foreign substance from flowing into the TCP 52 and the liquid crystal panel 32, thereby preventing a short between the TCP 52 and the pads formed on the liquid crystal panel 32.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a liquid crystal panel;
    a backlight assembly for radiating a light onto the liquid crystal panel, said backlight assembly having a light source and a light guide;
    optical sheets on the backlight assembly;
    a panel guide provided between the backlight assembly and the liquid crystal panel to support the liquid crystal panel; and
    a pad provided between the panel guide and the backlight assembly, in contact with the light guide, and fully offset from the light source and maintaining a distance between the panel guide and the backlight assembly.

2. The liquid crystal display device as claimed in claim 1, wherein the pad is provided between the light guide included in the backlight assembly and the panel guide.

3. The liquid crystal display device as claimed in claim 2, wherein the pad is a silicon pad provided between the light guide and the panel guide.

4. The liquid crystal display device as claimed in claim 2, wherein the pad is a resin coated between the light guide and the panel guide.

5. The liquid crystal display device as claimed in claim 1, further comprising:
    a main frame to which the backlight assembly is secured;
    a printed circuit board installed under the main frame;
    a tape carrier package mounted with drive integrated circuits for driving the liquid crystal panel and installed between the liquid crystal panel and the printed circuit board;
    a top case for surrounding the upper edge of the liquid crystal panel and the side of the main frame; and
    a bottom case installed under the printed circuit board and having one side assembled in such a manner to overlap with the top case.

6. The liquid crystal display device as claimed in claim 5, further comprising:
    a second silicon pad provided between the main frame and the printed circuit board to maintain a distance between the main frame and the printed circuit board; and
    a third silicon pad provided between the printed circuit board and the bottom case to maintain a distance between the printed circuit board and the bottom case.

7. The liquid crystal display of claim 6, wherein the tape carrier package is arranged between the printed circuit board and the third silicon pad.

8. A liquid crystal display device, comprising:
    a main frame;
    a liquid crystal panel;
    a backlight assembly arranged with the main frame for radiating light onto the liquid crystal panel, comprising:
    a lamp;
    a lamp housing; and
    a light guide;
    optical sheets:
    a panel guide provided between the backlight assembly and the liquid crystal panel for supporting the liquid crystal panel, wherein the panel guide and the main frame enclose a portion of the backlight assembly; and
    a first pad provided between the panel guide and the light guide and in contact with the light guide separating the liquid crystal panel and the optical sheets from the lamp, said pad fully overlapping the light guide.

9. The liquid crystal display of claim 8, further comprising:
   a printed circuit board under the main frame;
   a top case arranged on the liquid crystal panel and connected to a bottom case;
   a tape carrier package for connecting the printed circuit board to the liquid crystal display;
   a second pad between the main frame and the printed circuit board for fixing the distance between the main frame and the printed circuit board; and
   a third pad between the printed circuit board and the bottom case for fixing the distance between the bottom case and the printed circuit board.

10. The liquid crystal display of claim 9, wherein the tape carrier package is arranged between the printed circuit board and the third pad.

11. The liquid crystal display of claim 10, wherein the first pad, the second pad, and third pad include silicon.

12. A liquid crystal display device, comprising:
   a liquid crystal panel;
   a backlight assembly for radiating a light onto the liquid crystal panel, said backlight assembly having a light source and a light guide;
   optical sheets on the backlight assembly;
   a panel guide provided between the backlight assembly and the liquid crystal panel to support the liquid crystal panel;
   a pad provided between the panel guide and the backlight assembly in contact with the light guide and fully offset from the light source, said pad maintaining a distance between the panel guide and the backlight assembly,
   wherein said panel guide has a depression therein for receiving the pad.

13. The liquid crystal display device as claimed in claim 12, wherein the pad is provided between the light guide included in the backlight assembly and the panel guide.

14. The liquid crystal display device as claimed in claim 12, wherein the pad is a silicon pad provided.

15. The liquid crystal display device as claimed in claim 12, wherein the pad is a resin.

16. The liquid crystal display device as claimed in claim 12, further comprising:
   a main frame to which the backlight assembly is secured;
   a printed circuit board installed under the main frame;
   a tape carrier package mounted with drive integrated circuits for driving the liquid crystal panel and installed between the liquid crystal panel and the printed circuit board;
   a top case for surrounding the upper edge of the liquid crystal panel and the side of the main frame; and
   a bottom case installed under the printed circuit board and having one side assembled in such a manner to overlap with the top case.

17. The liquid crystal display device as claimed in claim 16, further comprising:
   a second silicon pad provided between the main frame and the printed circuit board to maintain a distance between the main frame and the printed circuit board; and
   a third silicon pad provided between the printed circuit board and the bottom case to maintain a distance between the printed circuit board and the bottom case.

18. The liquid crystal display device as claimed in claim 12, wherein said distance between the panel guide and the backlight assembly is approximately 0.4 mm.

* * * * *